United States Patent
Furfari et al.

(10) Patent No.: US 9,346,121 B2
(45) Date of Patent: May 24, 2016

(54) METHOD AND DEVICE FOR THE FRICTION STIR WELDING OF TWO COMPONENTS

(71) Applicant: AIRBUS OPERATIONS GMBH, Hamburg (DE)

(72) Inventors: Domenico Furfari, Hamburg (DE); Marco Pacchione, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/634,288

(22) Filed: Feb. 27, 2015

(65) Prior Publication Data
US 2015/0209894 A1 Jul. 30, 2015

Related U.S. Application Data

(62) Division of application No. 13/077,117, filed on Mar. 31, 2011, now Pat. No. 8,998,065.

(60) Provisional application No. 61/321,990, filed on Apr. 8, 2010.

(30) Foreign Application Priority Data

Apr. 8, 2010 (DE) .......... 10 2010 003 742

(51) Int. Cl.
*B23K 20/12* (2006.01)
*B23K 31/02* (2006.01)
(Continued)

(52) U.S. Cl.
CPC ............. *B23K 20/129* (2013.01); *B23K 20/002* (2013.01); *B23K 20/122* (2013.01);
(Continued)

(58) Field of Classification Search
CPC ............. B23K 20/122; B23K 20/1255; B23K 20/123; B23K 20/1225; B24B 39/00
See application file for complete search history.

(56) References Cited

U.S. PATENT DOCUMENTS

| 6,514,039 B1 | 2/2003 | Hand |
| 8,998,065 B2 | 4/2015 | Furfari et al. |

(Continued)

FOREIGN PATENT DOCUMENTS

| DE | 199 53 260.5 | 5/2001 |
| DE | 10 2008 014 320 | 9/2009 |

(Continued)

OTHER PUBLICATIONS

Restriction Requirement for U.S. Appl. No. 13/077,117 dated Feb. 16, 2012.

(Continued)

*Primary Examiner* — Erin Saad
(74) *Attorney, Agent, or Firm* — Jenkins, Wilson, Taylor & Hunt, P.A.

(57) ABSTRACT

A method for the friction stir welding of two components, in particular of two shell components of a fuselage structure of an aircraft and spacecraft, said method comprising the following method steps: positioning the two components relative to one another in such a way that a connection region is formed between the two components; friction stir welding the two components by means of a friction stir welding tool which penetrates the connection region in order to produce a weld which permeates the connection region with the formation of an unpenetrated weld edge portion of the connection region; and introducing internal compressive stresses, at least in the weld edge portion of the connection region. Further a device for the friction stir welding of two components, in particular of two shell components of a fuselage structure of an aircraft and spacecraft is provided.

14 Claims, 7 Drawing Sheets

(51) Int. Cl.
*B23K 37/08* (2006.01)
*B23K 20/00* (2006.01)
*B23K 20/26* (2006.01)

(52) U.S. Cl.
CPC ............ *B23K20/123* (2013.01); *B23K 20/124* (2013.01); *B23K 20/126* (2013.01); *B23K 20/1245* (2013.01); *B23K 20/1275* (2013.01); *B23K 20/26* (2013.01); *B23K 31/02* (2013.01); *B23K 37/08* (2013.01)

(56) References Cited

U.S. PATENT DOCUMENTS

| | | |
|---|---|---|
| 2003/0085257 A1 | 5/2003 | James et al. |
| 2005/0145678 A1 | 7/2005 | Murakami |
| 2005/0242066 A1 | 11/2005 | Statnikov |
| 2008/0073409 A1 | 3/2008 | Ostersehlte |
| 2009/0068491 A1 | 3/2009 | Maruko et al. |
| 2010/0038489 A1* | 2/2010 | Bense ............... B64C 1/12 244/131 |
| 2010/0096438 A1 | 4/2010 | Sato et al. |
| 2011/0151275 A1 | 6/2011 | Dobmann et al. |
| 2011/0248070 A1 | 10/2011 | Furfari et al. |
| 2015/0209892 A1 | 7/2015 | Furfari et al. |

FOREIGN PATENT DOCUMENTS

| | | |
|---|---|---|
| DE | 10 2008 028 996 | 12/2009 |
| EP | 0 688 627 | 6/1994 |
| WO | WO 2007/041739 | 4/2007 |

OTHER PUBLICATIONS

Non-Final Office Action for U.S. Appl. No. 13/077,117 dated Apr. 3, 2012.
Fianl Office Action for U.S. Appl. No. 13/077,117 dated Jul. 25, 2012.
Advisory Action for U.S. Appl. No. 13/077,117 dated Oct. 3, 2012.
Non-Final Office Action for U.S. Appl. No. 13/077,117 dated Jul. 13, 2013.
Final Office Action for U.S. Appl. No. 13/077,117 dated Dec. 4, 2013.
Advisory Action for U.S. Appl. No. 13/077,117 dated Feb. 13, 2014.
German Office Action for Application No. 10 2010 003 742.7 dated Apr. 10, 2014.
Non-Final Office Action for U.S. Appl. No. 13/077,117 dated Jun. 3, 2014.
Notice of Allowance for U.S. Appl. No. 13/077,117 dated Dec. 5, 2014.
Non-Final Office Action for U.S. Appl. No. 14/634,296 dated Jun. 1, 2015.
Final Office Action for U.S. Appl. No. 14/634,296 dated Nov. 17, 2015.

* cited by examiner

METHOD AND DEVICE FOR THE FRICTION STIR WELDING OF TWO COMPONENTS

CROSS-REFERENCE TO RELATED APPLICATIONS

This application is a division of and claims priority to U.S. application Ser. No. 13/077,117 filed Mar. 31, 2011, which claims the benefit of and priority to U.S. Provisional Application No. 61/321,990, filed Apr. 8, 2010 and German Patent Application No. 10 2010 003 742.7, filed Apr. 8, 2010, the entire disclosures of which are incorporated by reference herein.

TECHNICAL FIELD

The present invention relates to a method and a device for the friction stir welding of two components, in particular of two shell components of a fuselage structure of an aircraft and spacecraft.

BACKGROUND

In passenger aircraft and transport aircraft construction aluminium fuselage shell segments are generally riveted together along longitudinal seams. This requires, in addition to an overlap between the components to be connected in the seam region, a large number of individual components that have to be used. Rivet connections of this type are thus expensive to produce and signify an undesired increase in weight in the seam region.

An alternative joining method for connecting thin-walled aluminium components of this type is known as friction stir welding. In this instance a rotating tool with a tool pin protruding from a tool shoulder is pressed into a connection region between two components to be connected until the tool shoulder rests on the component surfaces adjacent to the connection region. The components lie on a support. The shoulder heats the component surfaces adjacent to the connection region by friction, thus heating the material of the components to just below the melting point. The tool is then moved along the connection region whilst maintaining the contact pressing force, the tool pin mixing plasticised material in the connection region. In order to prevent the components from being welded to the support, the penetration depth of the welding tool is set in such a way that the connection region is not fully penetrated. The size of this remaining unpenetrated region of the connection region is to be maintained in the order of a few tenths of a millimeter. If the depth of the remaining region exceeds a tolerance limit, 'penetration defects' or 'LOP' (lack of penetration) defects may be produced owing to internal tensile stresses induced in the material and insufficient material plasticisation. Such LOP defects significantly reduce the fatigue limit of welds produced by friction stir welding.

However, when welding large components with long welds, for example as is the case when constructing fuselage and aerofoil sections, compliance with such narrow tolerances is hugely complex from a technical point of view and is therefore virtually impossible. It is possible for example to use a 'bobbin friction stir welding tool' in order nevertheless to eliminate the formation of LOP defects. In contrast to the conventional friction stir welding pin tool, this bobbin friction stir welding tool is applied to the connection region from two sides, thus ensuring that the connection region is always fully penetrated. In this instance however, the connection region must be accessible from each side. Furthermore, when using this tool the weld is visible from each side, which is not desirable for example when connecting two components which form a visible surface. Furthermore, the use of the bobbin friction stir welding tool means that the time and therefore cost involved is higher compared to the friction stir welding pin tool.

An alternative to the use of a bobbin friction stir welding tool is the use of a conventional friction stir welding pin tool in combination with a further method step in which the region with possible LOP defects is removed by machining, for example by milling. This means that the weld must not extend through a visible surface since ghost lines would then be visible. This finishing, by machining, of the connection region also involves considerable additional time.

SUMMARY

The object of the present invention is therefore to provide an improved method for connecting two components, which method does not have the aforementioned drawbacks.

A method for the friction stir welding of two components, in particular of two shell components of a fuselage structure of an aircraft and spacecraft, is accordingly provided and comprises the following method steps: positioning the two components relative to one another in such a way that a connection region is formed between the two components; friction stir welding the two components by means of a friction stir welding tool which penetrates the connection region in order to produce a weld which permeates the connection region with the formation of an unpenetrated weld edge portion of the connection region; and introducing internal compressive stresses, at least in the weld edge portion of the connection region.

A device for the friction stir welding of two components, in particular of two shell components of a fuselage structure of an aircraft and spacecraft, is further provided and comprises a positioning means for positioning the two components relative to one another in such a way that a connection region is formed between the two components; a friction stir welding tool which can be applied in the connection region and which penetrates the connection region to produce a weld which permeates the connection region with the formation of an unpenetrated weld edge portion of the connection region; and a compressive stress generation means for introducing internal compressive stresses, at least into the weld edge portion of the connection region.

The idea on which the present invention is based is that internal compressive stresses are introduced at least into the weld edge portion of the connection region of the friction stir weld. These internal compressive stresses which are introduced prevent the formation and spread of microcracks in the connection region since they offset internal tensile stresses in the weld edge portion which are introduced during the friction stir welding process and non-positively seal any defects which have already formed. Both the fatigue limit and the residual strength can thus advantageously be increased in the region of the friction stir weld to the value of the base material of the welded components.

The present invention thus provides a method and a device which, in contrast to existing joining methods, make it possible to connect large-surface components in a rapid and reliable manner with minimal material usage.

Advantageous configurations and developments of the present invention will emerge from the dependent claims and from the description in conjunction with the figures shown in the drawings.

In accordance with a preferred development of the method according to the invention, the weld penetrates the components starting from a first surface of the components, and the internal compressive stresses are introduced from a second surface, which is opposite the first surface, of the components, at least in the weld edge portion of the connection region. It is thus advantageously possible for the internal compressive stresses to be introduced exclusively into those regions of the components where there is an increased risk of the formation of penetration defects.

In accordance with a further preferred development of the method according to the invention the internal compressive stresses are introduced up to a depth of the connection region which is greater than a depth of the weld edge portion of the connection region, the depth of the weld edge portion being 0.2 to 0.4 mm in particular. Internal tensile stresses, which promote crack formation and crack development, are thus reliably prevented in the material of the weld edge portion.

In accordance with a further preferred development of the method according to the invention the dynamic yield strength, at least of the material of the weld edge portion, is exceeded locally in order to produce the internal compressive stresses, whereby the material is plastically deformed locally, thus closing microcracks which are produced in the weld edge portion by the friction stir welding process. This reliably prevents any spreading of microcracks which have already been formed.

In accordance with a further preferred development of the method according to the invention the internal compressive stresses are introduced in an internal compressive stress region of influence in a transverse direction of the weld, which internal compressive stress region of influence is broader than a thermo-mechanical zone of influence formed by the friction stir welding tool along the weld. Internal compressive stresses are thus applied to the entire region of the components which is affected by the welding process.

In accordance with a further preferred development of the method according to the invention the internal compressive stresses are generated by means of laser shock peening, pulsed laser beams preferably being used. It is thus possible to introduce internal compressive stresses into the components in a contactless manner, thus simplifying the method according to the invention and accelerating the application thereof.

In accordance with a further preferred development of the method according to the invention, before the laser shock peening an opaque layer is applied to the components, at least over portions, to improve shock wave propagation in the components and to act as a sacrificial layer, and before the laser shock peening a transparent layer, in particular a layer formed of flowing water, is applied to the opaque layer to prevent reflection of the laser beam and to form a spatially defined plasma in the transparent layer. It is thus reliably ensured that shock waves which are large enough to form the internal compressive stresses are introduced into the components. The surface of the components is further prevented from being damaged since the opaque layer acts as a removable sacrificial layer.

In accordance with a further preferred development of the method according to the invention the internal compressive stresses are produced by means of low plasticity burnishing. This makes it possible, in addition to the introduction of internal compressive stresses, to improve surface quality by smoothing the component surface in the region of the weld.

In accordance with a further preferred development of the method according to the invention the internal compressive stresses are generated by means of ultrasonic peening. This makes it possible to also use the method at points which are not easily accessible, thus extending the scope of use of the method.

In accordance with a further preferred development of the method according to the invention the weld formed is configured as a butt weld. This makes it possible to connect the components without an overlap, thus advantageously making a saving in terms of weight.

In accordance with a further preferred development of the method according to the invention the internal compressive stresses are introduced at the same time as or in a chronologically staggered manner with regard to the formation of the weld. The introduction of the compressive stresses at the same time as the formation of the weld makes it possible to carry out the method according to the invention in a particularly rapid and cost-effective manner. By contrast, the introduction of the internal compressive stresses in a chronologically staggered manner with regard to the formation of the weld makes it possible to spatially separate the steps of introducing the internal compressive stresses and welding the components, the device for carrying out the method for friction stir welding of two components thus being composed in a particularly simple and cost-effective manner.

In accordance with a further preferred development of the method according to the invention the components are placed on a support rest for positioning and/or friction stir welding. This makes it possible to position the components reliably and precisely relative to one another, thus increasing the quality of the weld formed.

In accordance with a preferred development of the device according to the invention the compressive stress generation means is formed as a laser means for generating pulsed laser beams. This advantageously makes it possible to introduce the internal compressive stresses into the connection region of the components in a contactless and rapid manner.

In accordance with a further preferred development of the device according to the invention the positioning means is formed as a support rest. This makes it possible to position the components relative to one another in a simple and convenient manner.

The configurations and developments above can be combined in any appropriate manner.

In the following, the invention is described in further detail on the basis of embodiments with reference to the accompanying figures of the drawings.

DETAILED DESCRIPTION

Figure 1:
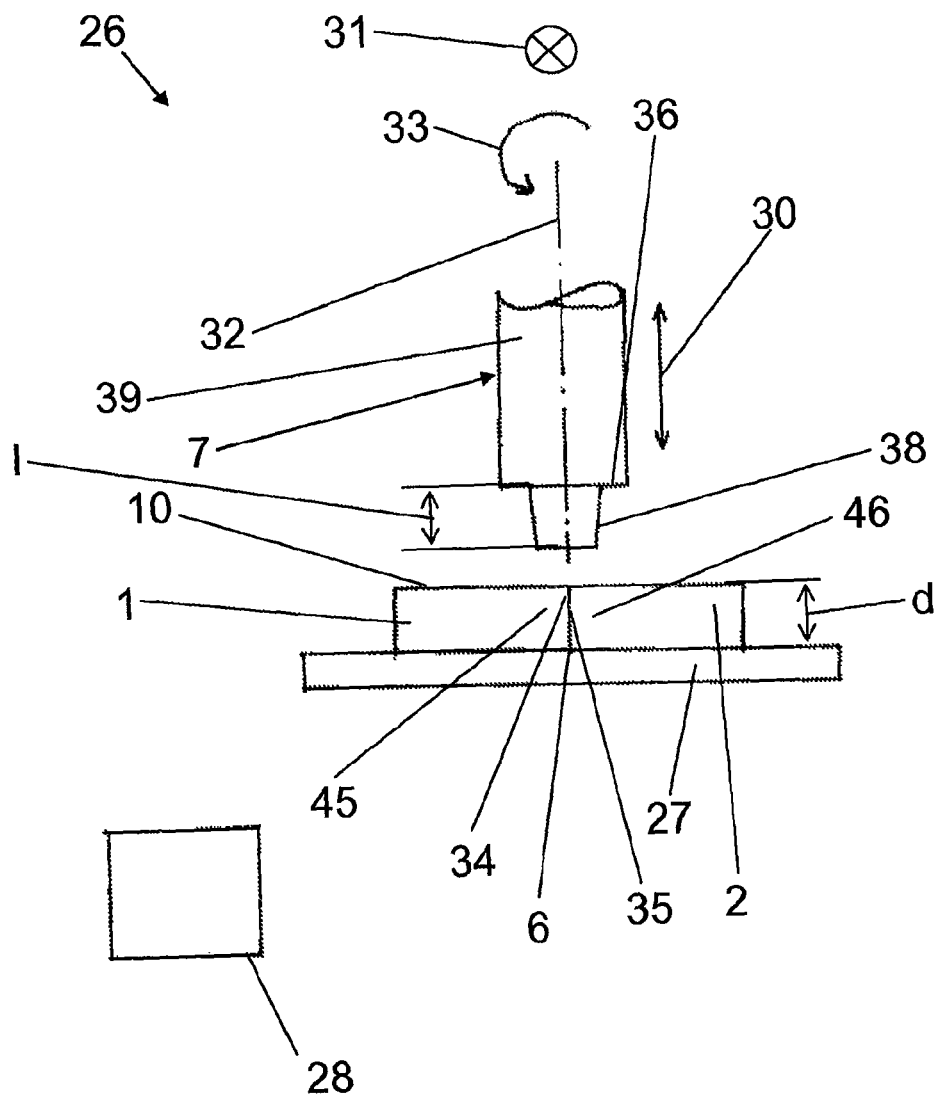
FIG. 1 is a front view of a preferred embodiment of a device for the friction stir welding of two components.

In the figures, like reference numerals refer to like or functionally similar components unless information to the contrary is given.

A preferred embodiment of the present invention will be described hereinafter with reference to FIGS. 1 to 7.

FIG. 1 shows a device 26 for the friction stir welding of two components 1, 2. The device 26 comprises a positioning means 27, which is preferably formed as a support rest 27 in the form of a plate-shaped rest, and a friction stir welding tool 7. The positioning means 27 is an optional component of the device 26. The friction stir welding tool 7 can be moved towards the positioning means 27 in the vertical direction. This possibility for movement is illustrated by the arrow 30. As illustrated by the arrow 31, the friction stir welding tool 7 is movable along a connection region 6 formed between the two components 1, 2. The friction stir welding tool 7 is substantially cylindrical. For example, it comprises a cylinder 39 with a first end face formed as a tool shoulder 36. For example a truncated cone 38 or a 'tool pin' 38 is arranged on the tool shoulder and has a smaller base diameter than the cylinder 39. The cylinder 39 and the truncated cone 38 are arranged so as to be collinear. An axial length l of the tool pin 38 corresponds approximately to a thickness d of the components 1, 2 to be welded. The friction stir welding tool is rotatable about an axis of rotation 32. This rotary movement is illustrated by means of the arrow 33.

The device 26 further comprises a compressive stress generation means 28 which is formed for example as a laser means 28 for the generation of pulsed laser beams.

The method steps for the friction stir welding of the two components 1, 2 will be described hereinafter. The two components 1, 2 are first preferably positioned relative to one another by means of the positioning means 27, in such a way that the connection region 6 is formed between the two components 1, 2. For this purpose the two components 1, 2 are placed for example on the support rest 27 and side faces 34, 35 of the components 1, 2 are positioned so as to be in contact. The connection region 6 comprises the side faces 34, 35 and end portions 45, 46, associated with the side faces 34, 35, of the components 1, 2. The side faces 34, 35 of the components 1, 2 preferably contact in the connection region 6. For example the components 1, 2 are fixed on the support rest 27 against slipping, preferably by clamping means (not shown). Preferably, the support rest 27 is formed as a vacuum table or the support rest 27 comprises a vacuum means, the components 1, 2 being fixable on the support rest 27 by means of the application of a vacuum.

Figure 2:
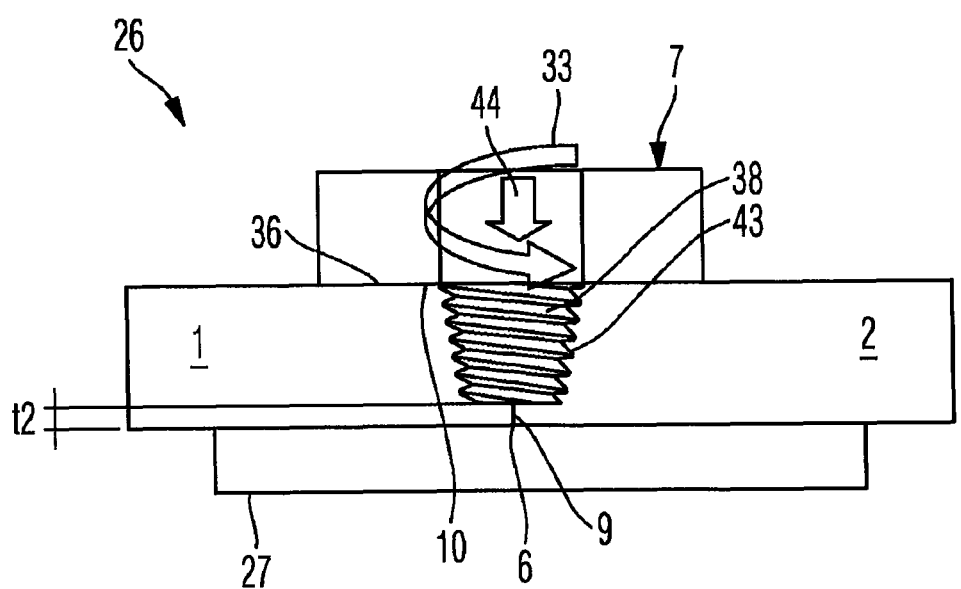
FIG. 2 is a cross-sectional view of the preferred embodiment of the device according to FIG. 1.
Figure 3:
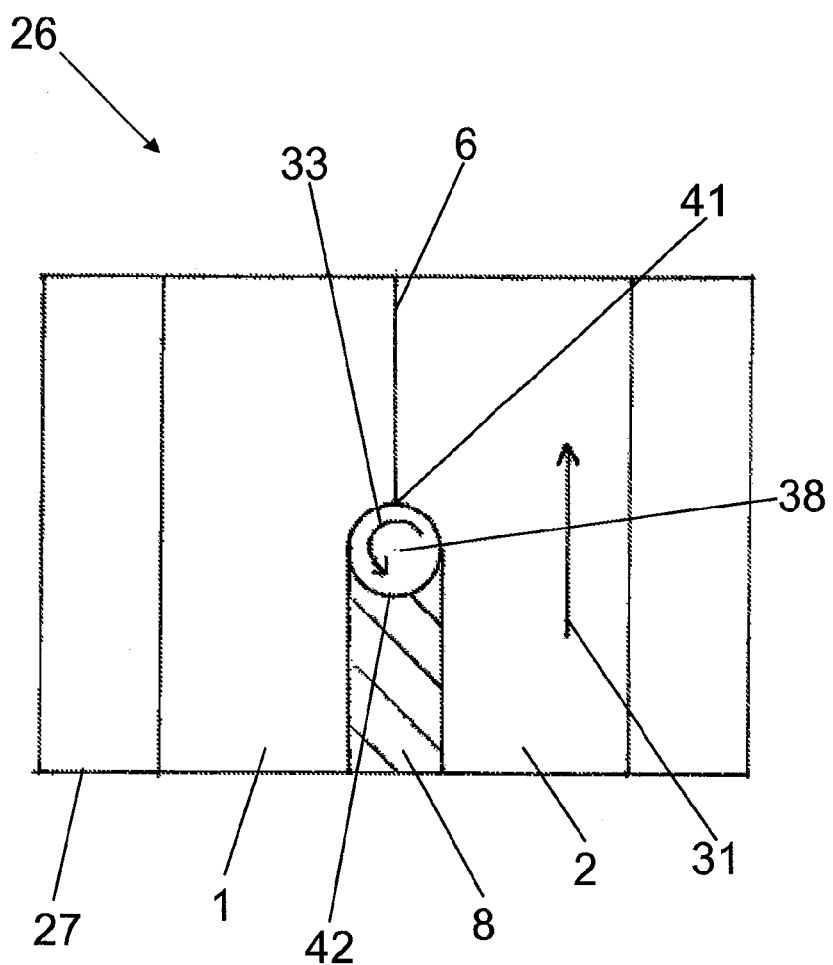
FIG. 3 is a plan view of two components to be welded.

The friction stir welding tool 7 is rotated and moved in the direction of a first surface 10 of the components 1, 2. The rotating friction stir welding tool 7 is pressed into the connection region 6 with a high contact pressing force 44 until the tool shoulder 36 comes to rest on the first surface 10. This is illustrated in FIG. 2. The tool pin 38 and the friction stir welding tool 7 penetrate the connection region 6, although not fully. The friction between the tool shoulder 36 and the first surface 10 of the components 1, 2 heats the material beneath the shoulder 36 to just below the melting point of the components 1, 2. The material is thus plasticised and it is possible to mix the materials of the components 1, 2 in the connection region 6. The tool pin 38 swirls the material. In order to better mix the material the tool pin 38 is preferably provided with a thread 43 which mixes the plasticised material of the components 1, 2.

The rotating friction stir welding tool 7 is then moved along the connection region 6, whilst maintaining the high contact pressing force 44. This feed movement in the direction of the arrow 31 produces a pressure gradient between a front and a rear face 41, 42 of the tool pin 38. The rotary movement of the friction stir welding tool 7 moves plasticised material about the friction stir welding tool 7, where said material is mixed and forms an approximately V-shaped weld 8 which is illustrated by hatching in FIG. 3. On the one hand the material is compressed by the force 44 directed vertically towards the surface 10 with the introduction of heat, and on the other hand is pressed downwardly towards a weld root 48 as a result of the geometry of the rotating tool 7 and the swirling of the partly plastic material. In this instance an extrusion duct is formed which extends as far as the weld root 48 and is also referred to as a weld nugget 47.

This weld 8 ideally fully penetrates the connection region 6 starting from the first surface 10. However, the tool pin 38 and the friction stir welding tool 7 preferably do not fully penetrate the two components 1, 2 in the connection region 6, but merely as far as a weld edge portion 9 of the connection region 6. Full penetration of the components 1, 2 by the tool pin 38 is to be avoided, since the components 1, 2 may thus be welded to the support rest 27 and/or the support rest 27 and/or the tool pin 38 may be damaged. The weld edge portion 9 of the connection region 6 is preferably also welded by the introduction of frictional heat in the connection region 6 owing to the rotating friction stir welding tool 7 and by the mechanical mixing of the plasticised material of the components 1, 2 in the connection region 6, in such a way that the weld 8 fully permeates the connection region 6. Deviating from the aforementioned ideal scenario, the weld 8 penetrates the weld edge portion 9, which is not penetrated by the tool 7, over a length of the weld 8, but only over portions or else not at all. For example the weld edge portion 9 has a thickness t2 of preferably 0.2 to a maximum of 0.4 mm. The thickness t2 is highly dependent on the geometry of the friction stir welding tool 7 used and on the welding process parameters used, i.e. the thickness t2 can deviate considerably from the aforementioned values depending on the geometry of the tool used and/or on the process parameters used. The thickness t2 is to be precisely maintained over the entire weld length during the welding process in order to obtain high and constant strengths of the weld 8. This precise maintenance of the thickness t2 can only be achieved with difficulty, even in a mechanical welding process, for example with use of a robotic arm to position the tool 7. This applies in particular when welding large, curved components such as components of aircraft fuselages.

Figure 4:
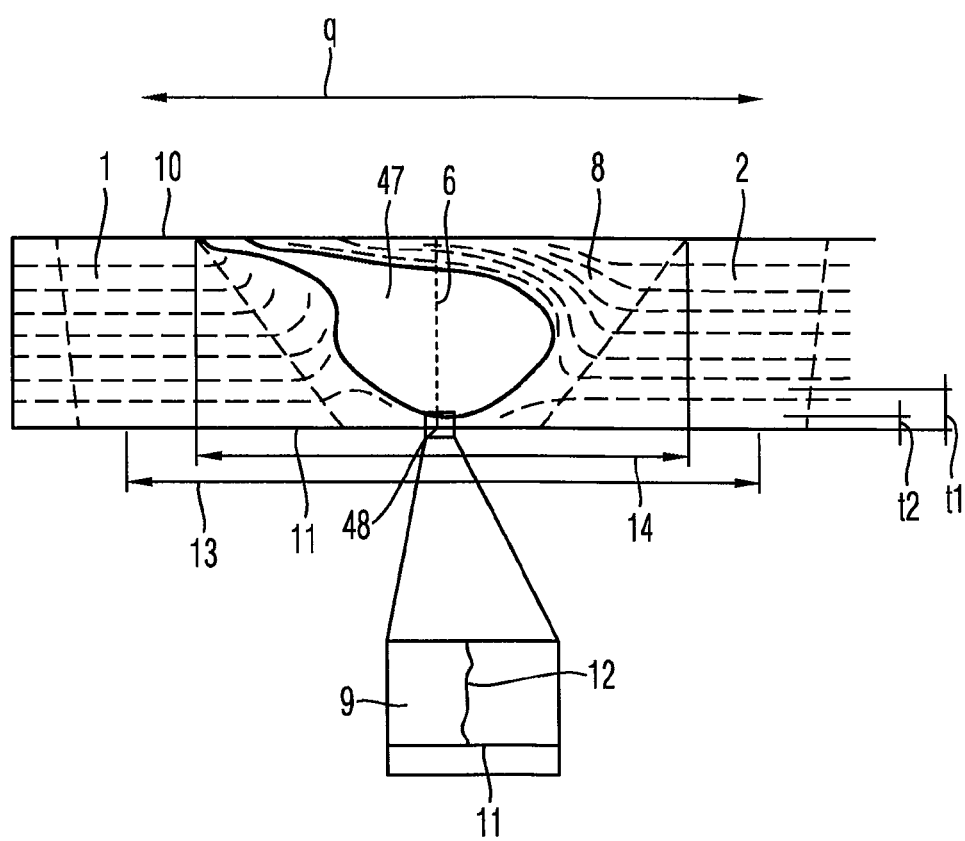
FIG. 4 is a cross-sectional view of a weld.

If this thickness t2 is not precisely maintained within the aforementioned tolerance range over the entire length of the weld 8, i.e. if the thickness t2 exceeds the maximum value, which is hugely costly from a technical point of view in the case of large weld lengths on large components, defects, for example in the form of microcracks 12, may appear in the region of the weld edge portion 9, as is shown in FIG. 4. Such defects may occur owing to incomplete plasticisation of the materials of the components 1, 2 and/or owing to internal tensile stresses induced in the material by the welding process. Internal tensile stresses promote the formation of microcracks 12 and crack growth of a microcrack 12 which is already present. Such defects in the weld edge portion 9 caused by insufficient penetration of the friction stir welding tool 7 are known as LOP (lack of penetration) defects. These LOP defects can considerably reduce the service life of friction stir welded components 1, 2, in particular friction stir welded aluminium components.

In order to limit the effect of such LOP defects, produced during friction stir welding, on the service life of the weld 8, internal compressive stresses are introduced in a further method step, at least into the weld edge portion 9 of the connection region 6 of the two components 1, 2. These internal compressive stresses are preferably introduced from a second surface 11 of the connection region 6, which surface is arranged opposite the first surface 10 of the components 1, 2.

These internal compressive stresses prevent microcracks 12 from spreading since said microcracks 12 are compressed, so to speak. The internal compressive stresses introduced further counteract internal tensile stresses induced in the connection region during the welding process, i.e. they offset said internal tensile stresses. The internal compressive stresses are preferably introduced up to a depth t1 of the connection region 6, which depth is preferably greater than the depth t2 of the weld edge portion 9 of the connection region 6. Internal tensile stresses are thus reliably prevented from acting in the weld edge portion 9. Any remaining internal tensile stresses then act merely in the region of the portion of the connection region 6 penetrated by the tool pin 38.

In order to produce the internal compressive stresses in the material of the connection region 6, the dynamic yield strength of the material is exceeded locally, at least in the region of the weld edge portion 9, thus plastically deforming the material locally. The internal compressive stresses are introduced in an internal compressive stress region of influence 13 in a transverse direction q of the weld. The internal compressive stress region of influence 13 is preferably broader than a diameter of the tool pin 38. For example the internal compressive stress region of influence 13 is broader than a diameter of the tool shoulder 36 of the tool 7. This means that the internal compressive stresses are introduced in a planar manner on each side of the weld 8. The thermomechanical zone of influence 14 is substantially V-shaped, wherein the open sides of the V point towards the first surface 10.

Figure 5:
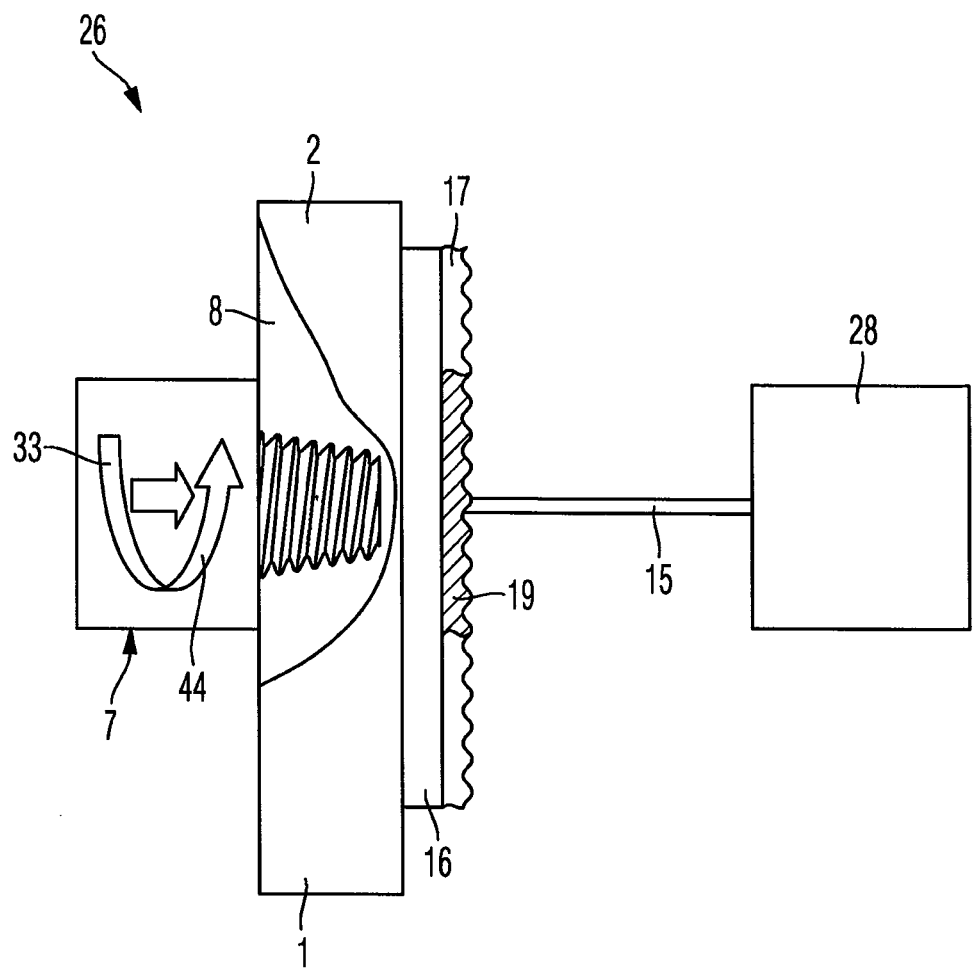
FIG. 5 is a side view of a further embodiment of a device for the friction stir welding of two components.

As illustrated in FIG. 5, the internal compressive stresses are preferably generated by means of laser shock peening, wherein pulsed laser beams 15 are preferably used which are generated by the compressive stress generation means 28, for example in the form of a laser means 28. The laser shock peening is preferably carried out in a chronologically staggered manner with regard to the formation of the weld 8. Alternatively, the internal compressive stresses can also be introduced into the weld edge portion 9 of the connection region 6 at the same time as the formation of the weld 8. For this purpose the positioning means 27 may, for example, comprise a recess which is formed in such a way that the second surface 11 is accessible, at least over portions, for the introduction of the internal compressive stresses. The positioning means 27 can alternatively be completely omitted.

With laser shock peening an opaque layer 16, for example in the form of an aluminium foil, is preferably applied to the components 1, 2, at least in the region of the connection region 6. This opaque layer 16 improves shock wave propagation in the components 1, 2, and it is also used as a sacrificial layer, i.e. it is removed again after the laser shock peening process.

A transparent layer 17, in particular a layer of flowing water 17, is preferably applied to the opaque layer 16. This prevents reflection of the laser beam 15 and thus makes it possible to form a spatially defined plasma 19 in the transparent layer 17. The shock waves are generated by the plasma 19 and therefore only indirectly by the laser beam 15.

The internal compressive stresses can alternatively also be introduced into the weld edge portion 9 by means of mechanical methods, such as the 'low plasticity burnishing' (LPB) method. In this instance a steel ball accommodated in a hydrostatic bearing is guided over the surface of the component, the material of the component being plastically deformed locally and internal compressive stresses being introduced into the component.

For example 'ultrasonic peening' (UP) may also be considered as a further alternative for the introduction of the internal compressive stresses into the weld edge portion 9. In this instance an ultrasonic sonotrode is placed on the surface of the component. The material of the component is plastically deformed locally, whereby internal compressive stresses are introduced into the component.

Figure 6:
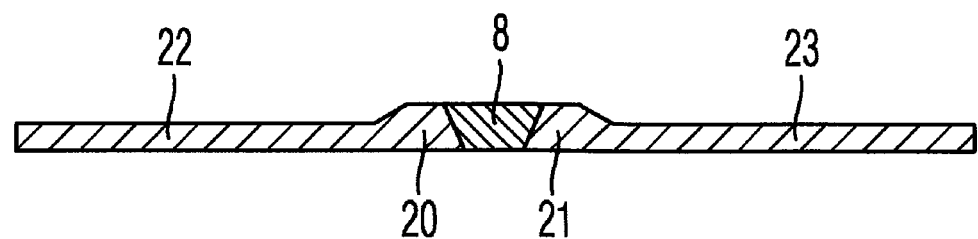
FIG. 6 is a cross-sectional view through two welded components.

FIG. 6 shows a cross-sectional view of the welded components 1, 2, which are preferably formed as thin-walled metal sheets 22, 23. The metal sheets 22, 23 preferably consist of an aluminium alloy. The method can thus be used, in particular, for the construction of fuselage structures of aircraft and spacecraft from thin-walled aluminium components. The metal sheets 22, 23 have thickenings 20, 21 in the region of the weld 8 formed as a butt weld 8. As a result of the thickenings 20, 21, more material is available for plasticisation in the connection region 6. This makes it possible to form the weld 8 in an improved manner with a large weld thickness.

Figure 7:
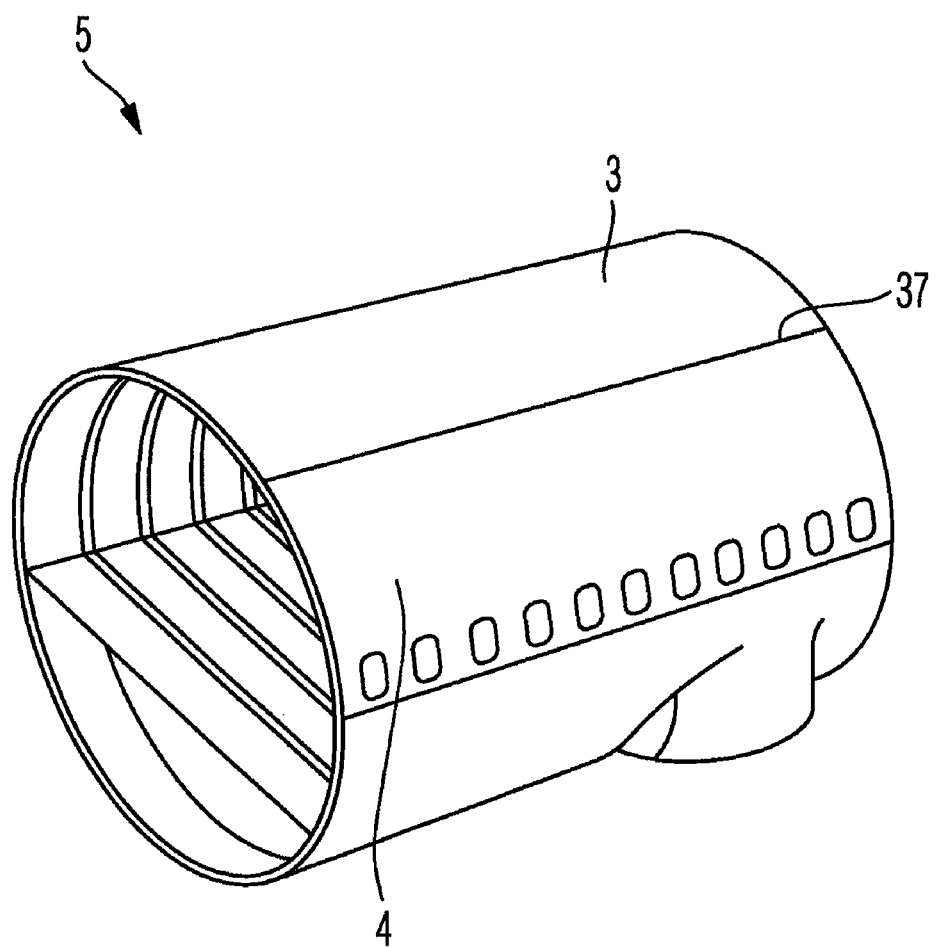
FIG. 7 is a perspective view of a fuselage section with a longitudinal seam.

FIG. 7 is a schematic view of a fuselage structure 5 of an aircraft and spacecraft. In this case the components 1, 2 are preferably formed as shell components 3, 4, between which the weld 8 is formed as a longitudinal seam 37.

By means of the method according to the invention it is thus possible to connect large-surface components by long friction stir welds without running the risk of LOP defects being formed. For example, compared to known joining methods, shell components of a fuselage structure of an aircraft and spacecraft can thus be reliably connected more quickly, with a greater saving in terms of weight and with lower material usage.

Although the present invention was described with reference to preferred embodiments, it is not limited thereto, but can be modified in many different ways. In particular, features of the individual embodiments detailed above can be combined in any appropriate manner.

In a particularly preferred modification of the present invention, the method according to the invention is used, for example, to connect overlapping welds, corner welds, T-welds and the like.

The materials, numbers and dimensions stated should be understood to be exemplary and serve merely to explain the embodiments and developments of the present invention.

Use of the invention in other fields, in particular in vehicle or marine construction, is of course also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 1 component
2 component
3 shell component
4 shell component
5 fuselage structure
6 connection region 7 friction stir welding tool
8 weld/butt weld
9 weld edge portion
10 first surface
11 second surface
12 microcracks
13 internal compressive stress region of influence
14 thermo-mechanical zone of influence
15 pulsed laser beam
16 opaque layer
17 transparent layer/flowing water
19 defined plasma
20 thickening
21 thickening
22 metal sheet
23 metal sheet
26 device
27 positioning means/support rest
28 compressive stress generation means/laser means
30 arrow
31 arrow
32 axis of rotation
33 arrow
34 side face
35 transverse direction
36 tool shoulder
37 longitudinal seam
38 truncated cone/tool pin
39 cylinder
41 front face
42 rear face
43 thread
44 contact pressing force
45 end portion
46 end portion
47 weld nugget
48 weld root
d component thickness
l length
q transverse direction
t1 thickness
t2 thickness

The invention claimed is:

1. A method for friction stir welding of two components, said method comprising:
   positioning the two components relative to one another such that a connection region is formed between the two components;
   friction stir welding the two components by a friction stir welding tool which penetrates the connection region in order to produce a weld which permeates the connection region with the formation of an unpenetrated weld edge portion of the connection region; and
   introducing internal compressive stresses, at least in the weld edge portion of the connection region, wherein the internal compressive stresses are generated by low plasticity burnishing with a steel ball in a hydrostatic bearing being guided over a surface of at least one of the two components to plastically deform a material of the at least one of the two components locally.

2. The method according to claim 1, wherein the weld penetrates the components starting from a first surface of the components, and wherein the internal compressive stresses are introduced from a second surface, which is opposite the first surface, of the components, at least in the weld edge portion of the connection region.

3. The method according to claim 1, wherein the internal compressive stresses are introduced up to a depth of the connection region which is greater than a depth of the weld edge portion of the connection region.

4. The method according to claim 1, wherein the dynamic yield strength, at least of the material of the weld edge portion, is exceeded locally in order to produce the internal compressive stresses, whereby the material is plastically deformed locally and microcracks formed in the weld edge portion by the friction stir welding process are closed.

5. The method according to claim 1, wherein the internal compressive stresses are introduced in an internal compressive stress region of influence in a transverse direction of the weld, which internal compressive stress region of influence is preferably broader than a diameter of a tool pin of the friction stir welding tool.

6. The method according to claim 1, wherein the weld formed is configured as a butt weld.

7. The method according to claim 1, wherein the internal compressive stresses are introduced at the same time as or in a chronologically staggered manner with regard to the formation of the weld.

8. The method according to claim 1, wherein the components are placed on a support rest for positioning and/or friction stir welding.

9. A device for friction stir welding of two components, comprising:
   a positioning component configured to position the two components relative to one another in such a way that a connection region is formed between the two components;
   a friction stir welding tool which can be moved into the connection region and which penetrates the connection region in order to produce a weld which permeates the connection region with the formation of an unpenetrated weld edge portion of the connection region; and
   a compressive stress generator configured to introduce internal compressive stresses, at least into the weld edge portion of the connection region, wherein the internal compressive stresses are generated by low plasticity burnishing with a steel ball in a hydrostatic bearing being guided over the surface of at least one of the two components to plastically deform a material of the at least one of the two components locally.

10. The device according to claim 9, wherein the positioning component is configured as a support rest.

11. The method according to claim 1, wherein the method is for friction stir welding of two shell components of a fuselage structure of an aircraft and spacecraft.

12. The method according to claim 3, wherein the depth of the weld edge portion is 0.2 to 0.4 mm.

13. The method according to claim 5, wherein the internal compressive stress region of influence is broader than a diameter of a tool shoulder of the friction stir welding tool.

14. The device according to claim 9, wherein the device is for friction stir welding of two shell components of a fuselage structure of an aircraft and spacecraft.

* * * * *